No. 823,012. PATENTED JUNE 12, 1906.
C. T. WESTLAKE & A. R. THOMAS.
MEANS FOR BALANCING CRANK WHEELS.
APPLICATION FILED APR. 2, 1906.
2 SHEETS—SHEET 1.
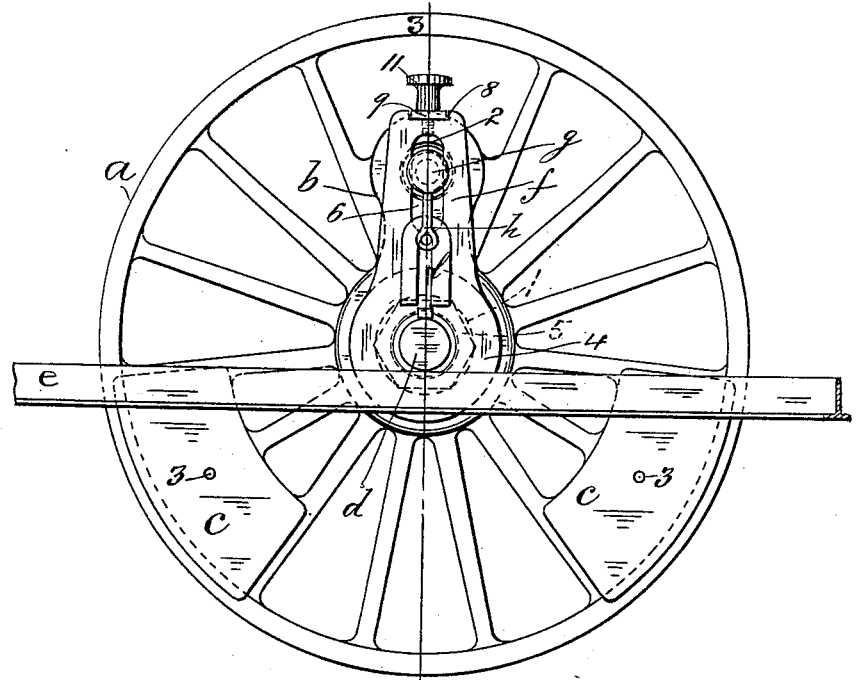
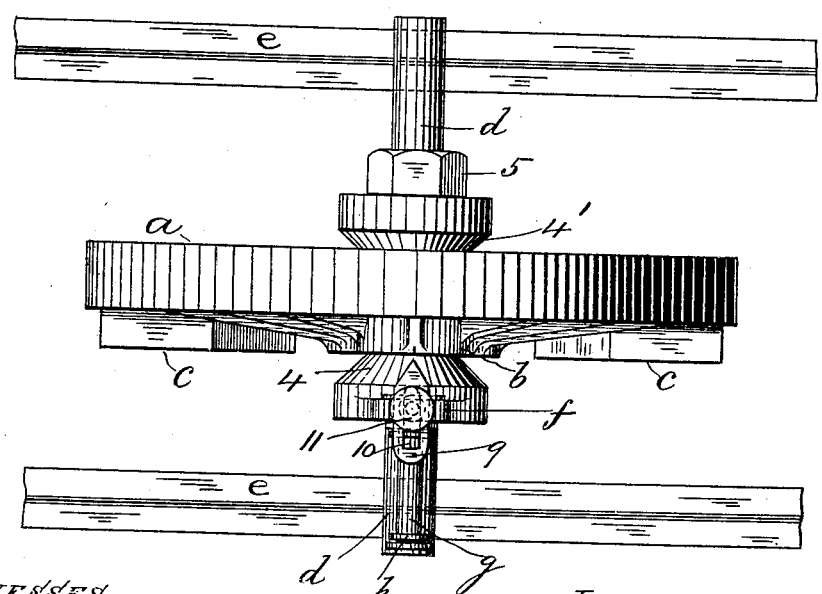
WITNESSES
INVENTORS
Charles T. Westlake
Albert R. Thomas
By Edward W. Furrell
their Atty No. 823,012. PATENTED JUNE 12, 1906.
C. T. WESTLAKE & A. R. THOMAS.
MEANS FOR BALANCING CRANK WHEELS.
APPLICATION FILED APR. 2, 1906.
2 SHEETS—SHEET 2.
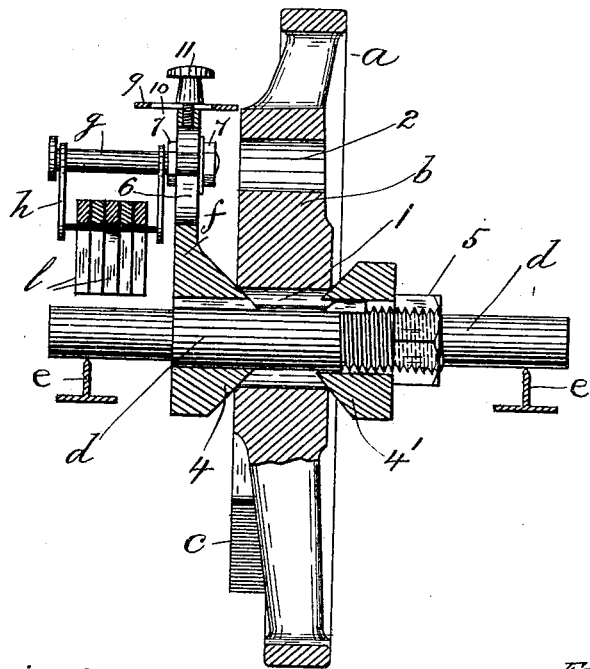
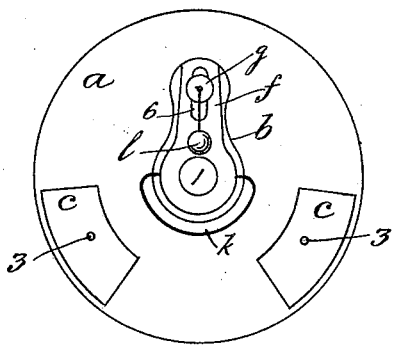
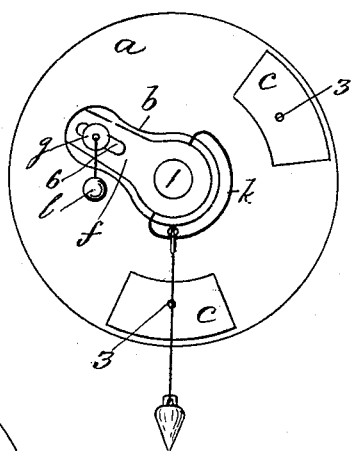
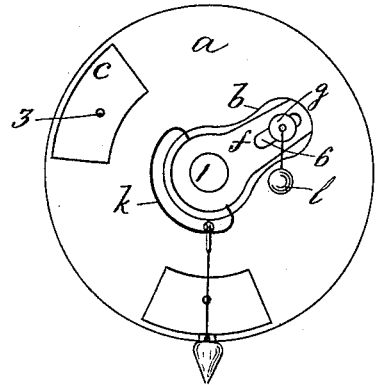
WITNESSES
INVENTORS
Charles T. Westlake
Albert R. Thomas
By Edward W. Furrell
their Atty

UNITED STATES PATENT OFFICE.

CHARLES T. WESTLAKE, OF ST. LOUIS, MISSOURI, AND ALBERT R. THOMAS, OF GRANITE CITY, ILLINOIS, ASSIGNORS TO DAVIS LOCOMOTIVE WHEEL COMPANY, OF ST. LOUIS, MISSOURI, A CORPORATION OF DELAWARE.

MEANS FOR BALANCING CRANK-WHEELS.

No. 823,012. Specification of Letters Patent. Patented June 12, 1906.

Application filed April 2, 1906. Serial No. 309,480.

*To all whom it may concern:*

Be it known that we, CHARLES T. WESTLAKE, residing at St. Louis, in the State of Missouri, and ALBERT R. THOMAS, residing at Granite City, in the county of Madison and State of Illinois, citizens of the United States, have invented new and Improved Means for Balancing Crank-Wheels, of which the following is a specification.

Our invention relates to means for centering and determining the counterbalance-weights necessary for balancing a crank-wheel with its crank-pin and the load thereon arising from the weight of the reciprocating parts of the engine or mechanism coupled thereto before pressing the wheel onto its axle; and the invention consists in features of novelty, as hereinafter described and claimed, reference being had to the accompanying drawings, forming part of this specification, whereon—

Figure 1 is a side elevation of a crank-wheel having our improved centering and balancing apparatus applied thereto; Fig. 2, a top plan view thereof; Fig. 3, a vertical transverse section through the same on line 3 3 in Fig. 1; Fig. 4, a diagrammatic view of the wheel corresponding to Fig. 1, showing the position of the crank-arm and counterbalance-weights preparatory to balancing the same; and Figs. 5 and 6, similar views of the wheel, showing the relative positions of the said parts in the operation of balancing the counterweights seen to the right and left, respectively, of the crank-arm.

Like letters and numerals of reference denote like parts in all the figures.

$a$ represents a crank-wheel having the axle-hole 1 and the crank-arm $b$, in which is formed the hole 2 for the crank-pin (not shown) in the usual well-known manner. For counterbalancing the combined weight of the crank-arm $b$ and its loaded crank-pin the wheel $a$ is formed or provided, preferably near its circumference at an equal distance radially from the arm $b$ and from each other, with preferably two counterbalance-weights $c$ of equal weight, their aggregate weight, owing to inequality of casting, being greater or less than that required for balancing the weight of the parts before mentioned.

Previous to balancing the wheel $a$ a circular hole 3 is preferably formed transversely through each counterbalance-weight $c$ parallel to the axis of the wheel $a$ and described about a center line which intersects the center of gravity of the counterbalance $c$, or in lieu of the hole 3 the position of the center of gravity may be indicated by a center punch or other mark on the outer face of the counterbalance $c$.

The center of the axle-hole 1 of the wheel $a$ is then marked, and from the hole 3 or center punch mark, as the case may be, of each counterbalance $c$ is described a circular arc, the two arcs intersecting each other on the face of the crank-arm $b$, and a line is then drawn through their point of intersection and the center of the axle-hole 1, which determines the radial center line of the crank-pin hole 2.

Our improved centering and balancing apparatus as applied to the wheel $a$, constructed and marked as above described, comprises a temporary spindle or axle $d$, diametrically smaller than the axle-hole 1, through which the spindle $d$ is passed and mounted circumferentially at a suitable distance from each side of the wheel $a$ on two parallel and horizontally-arranged edge runners $e$, which are suitably fixed at right angles to the spindle $d$. On the spindle $d$ at one side of the wheel $a$ is fixed an arm $f$, having its hub 4 conical or tapering from its junction with the arm $f$ to its minimum diameter around the spindle $d$, adjacent to the axle-hole 1 of the wheel $a$. On the spindle $d$ at the other side of the wheel $a$ is a corresponding conical block 4', which is adapted to slide freely along the spindle $d$ and to engage at its small end with the edge of the axle-hole 1, the spindle $d$ being screw-threaded thereat and for a suitable distance beyond the outer face of the block 4', where it is provided with a nut 5, which when screwed home against the block 4' forces the latter along the spindle $d$ until its small end enters and engages the edge of the axle-hole 1, and thereby moves the wheel $a$ along the spindle $d$ and causes the edge of the other end of the axle-hole 1 to engage the small end of hub 4 of the arm $f$, whereby the wheel $a$ becomes centered on the spindle $d$.

Transversely through the arm $f$, along the radial center line thereof between its hub 4 and its outer free end, is formed a slot 6, in which is adjustably fixed by nuts 7 the screw-threaded end of a pin $g$, which projects from the outer face of the arm $f$ at right angles thereto and in the radial center line thereof, and from the pin $g$ preferably depends a yoke $h$, which is hinged by its arms and adapted to swing freely about the pin $g$, or the yoke $h$ may be dispensed with.

Preferably across the outer free end of the arm $f$ is formed a recess 8 for receiving a flat index-bar 9, which projects beyond the faces of the arm $f$ and is tapered to a point at one end in proximity to the face of the crank-arm $b$, the said point coinciding with the radial center line of the arm $f$ and the center of its pin $g$, the bar 9 having a longitudinal slot 10 therethrough and adjustably fixed to the arm $f$ by a clamp-screw 11, which passes through the slot 10 and is threaded into the arm $f$ at the bottom of the recess 8, as shown.

For centering and balancing the wheel $a$ by the apparatus above described, assuming the wheel $a$ to be mounted on the spindle $d$ with its crank-arm $b$ and counterbalance-weights $c$ in the position seen in Figs. 1, 2, 3, and 4 and with its axle-hole 1 in approximate engagement with the conical hub 4 of the arm $f$ and the block 4', the arm $f$, with the spindle $d$, is adjusted radially until the index bar or pointer 9 on the arm $f$ coincides with the radial center line of the crank-pin hole 2 marked on the crank-arm $b$, when by tightening the nut 5 against the block 4' the wheel $a$ and arm $f$ are truly centered and clamped together on the spindle $d$.

The pin $g$ of the arm $f$ is then adjusted along its slot 6 and fixed by the nuts 7 to the arm $f$ in alinement with the center of the crank-pin hole 2 and the wheel $a$ partially rotated therewith and with the spindle $d$ along the runners $e$ into the position indicated by Fig. 5, in which the counterbalance $c$ seen to the left of the crank-arm $b$ is at its lowest position, so that a plumb-line $i$, suspended from a wire-runway $k$, concentric with and carried by the hub 4 of the arm $f$, coincides with the hole 3 or center of gravity of the counterbalance $c$, as shown.

Test-weights $l$, including the temporary arm $f$ and its appendages and equal in the aggregate to the computed weight of the crank-arm $b$ with its crank-pin and appurtenances before mentioned, are then suspended from the yoke $h$, (or directly from the pin $g$ when the yoke $h$ is omitted,) and if the other counterbalance $c$, seen to the right of the crank-arm $b$, (the counterbalance $c$ to the left being now neutral,) is correct the wheel $a$ will be in equilibrium in that position, but if greater than the test-weights $l$ the difference in weight must be added to the test-weights $l$ and if less a corresponding weight removed from the test-weights $l$ until equilibrium is established between the latter and the counterbalance $c$, the plus or minus variation from the initial computed test-weights $l$ being recorded and after the removal of the balancing apparatus from the wheel $a$ respectively subtracted from or added to the counterbalance $c$, as the case may be, in any suitable manner.

Similarly, by partially rotating the wheel $a$ with the spindle $d$ along the runners $e$ in the opposite direction or so that the counterbalance $c$ seen to the right of the crank-arm $b$ is in the lowest position, as indicated by the plumb-line $i$, and consequently neutral, as shown in Fig. 6, the counterbalance $c$ to the left of the crank-arm $b$ is corrected.

What we claim as our invention, and desire to secure by Letters Patent, is—

1. The means for balancing a crank-wheel, consisting of a spindle adapted to pass through the axle-hole of the wheel and revoluble on suitable bearings, an arm fixed to the spindle and radially adjustable about the center of the wheel, a pin projecting at right angles from, and adjustable along the said arm, and adapted to carry a weight, and an index-bar adjustably fixed across the said arm at right angles to the wheel-face, substantially as described.

2. The means for centering and balancing a crank-wheel, consisting of a spindle adapted to pass freely through the axle-hole of the wheel and revoluble on suitable bearings, an arm fixed to the spindle, the said arm having a conical hub concentric with the spindle and adapted to be engaged by the edge of the said hole on one side of the wheel, a conical block adapted to slide along the spindle and to engage the edge of the said hole on the other side of the wheel, means for moving the block along the spindle, and a pin projecting at right angles from, and adjustable along the said arm and adapted to carry a weight, substantially as described.

In testimony whereof we have signed our names to this specification in the presence of two subscribing witnesses.

CHARLES T. WESTLAKE.
ALBERT R. THOMAS.

Witnesses:
  MARY D. WHITCOMB,
  EDWARD W. FURRELL.